Patented Dec. 11, 1928.

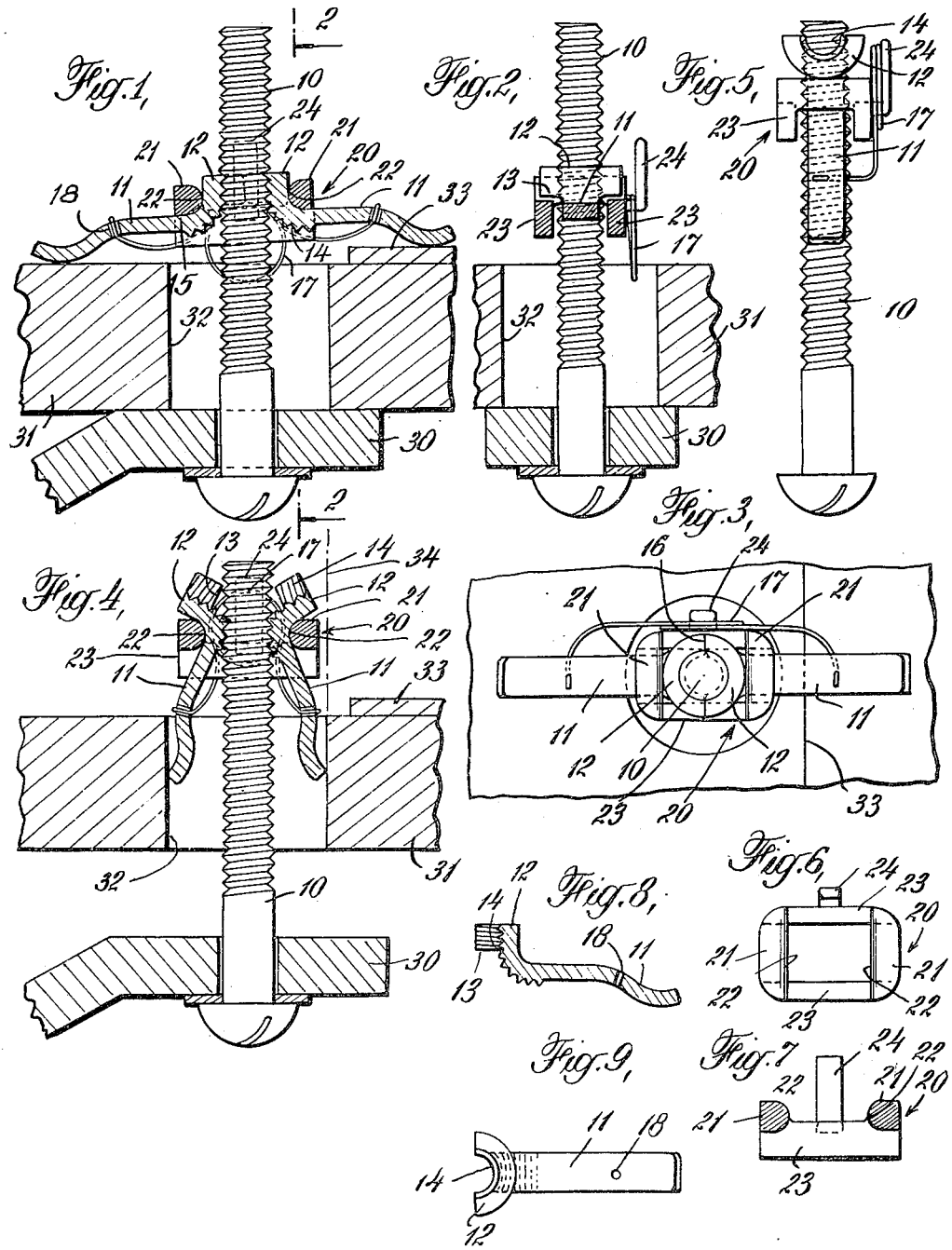

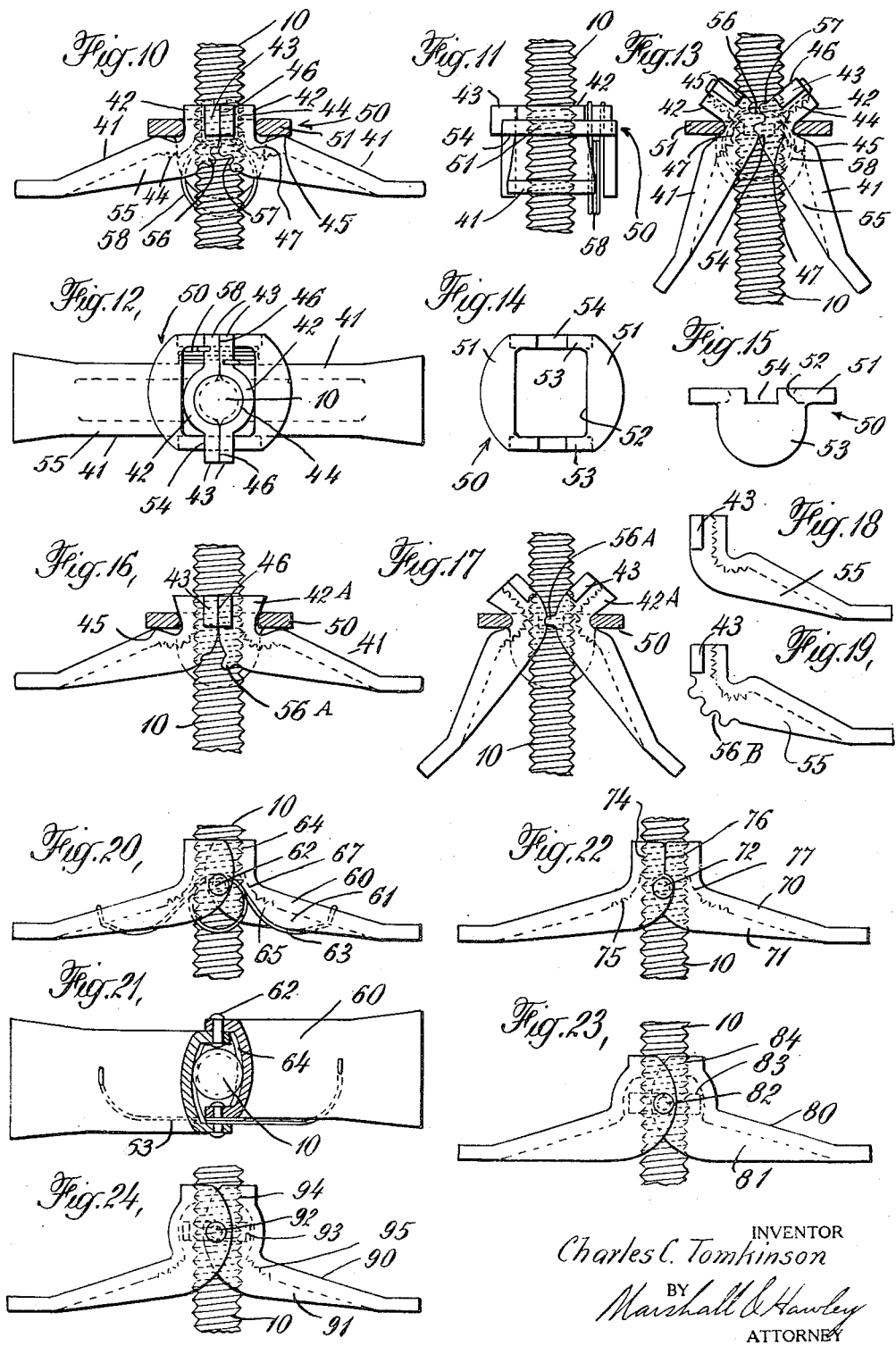

1,694,493

UNITED STATES PATENT OFFICE.

CHARLES C. TOMKINSON, OF PLAINFIELD, NEW JERSEY, ASSIGNOR TO J. EDWARD OGDEN, OF MOUNTAINVILLE, NEW YORK.

TOGGLE BOLT.

Application filed February 3, 1925. Serial No. 6,617.

This invention relates specifically to improvements in toggle bolts or anchoring devices which may be passed through a hole in a wall or other structure and expanded into engaging contact with the inner side of such structure when such structure is not accessible to the hands, and one of its objects is to provide a simple device for this purpose.

Another object is to provide a unitary toggle head which may be removed from the screw or bolt with which it is to be used, without falling apart. Another object is to so construct a toggle head that it may be slipped along a threaded bolt to desired position thereon. Further specific objects are to provide a toggle bolt which may be manipulated readily with one hand and which will first automatically fold and then automatically expand as it is passed through an orifice and which possesses the qualities of simplicity in manufacture, strength in use and of being automatically adaptable to engagement with uneven surfaces.

More generically, this invention relates to a split nut of novel construction which is capable of use with other structures than those herein shown and described.

Referring to the drawings:

Fig. 1 is a sectional elevation of a toggle bolt which embodies the present invention, and of parts which are fastened together by it.

Fig. 2 is a sectional elevation of the toggle bolt of Fig. 1 taken at right angles to the latter view on the line 2—2.

Fig. 3 is a plan view of the device.

Fig. 4 is a sectional elevation of the parts shown in Fig. 1 illustrating the way the toggle head is passed through an orifice.

Fig. 5 is an elevation of the toggle bolt with its parts in the positions in which they are shown in Fig. 4, the view being taken at right angles to that of Fig. 4.

Figs. 6 and 7 are respectively a top plan view and a sectional side elevation of a collar which forms a part of the structure shown in the preceding figures.

Figs. 8 and 9 are respectively a sectional side elevation and a top plan view of one of the two wings which form the anchorage members of this device.

Figs. 10 and 11 are side elevations at right angles to each other, and Fig. 12 a top plan view of a modified form of the toggle bolt of this invention.

Fig. 13 is similar to Fig. 10 but shows the wings adjusted to their "slip" position.

Figs. 14 and 15 are respectively a top plan view and a side elevation of the collar used in the structure shown in Figs. 10–13.

Fig. 16 is a side elevation of a toggle bolt having a pair of wings similar to those shown in Figs. 10–13 but of modified construction.

Fig. 17 is a side elevation of the toggle bolt of Fig. 16 with its wings in slip position.

Figs. 18 and 19 are side elevations of wings of modified constructions.

Fig. 20 is a side elevation, and Fig. 21 is a sectional plan view of a different form of toggle bolt embodying this invention.

Another form of construction is shown in side elevation of Fig. 22.

Still further modifications are illustrated in side elevations in Figs. 23 and 24.

Referring first to the simple form of the device shown in Figs. 1–9, 10 designates a threaded screw or bolt. 11 are wings, the inner ends of which are enlarged as at 12 and of such shape as to form when the wings are expanded, a split nut, half of which is formed by this portion of one of the wings. The other part of each wing extends at substantially right angles from this nut-forming part and is joined thereto by a curved intermediate portion. A shoulder 13 is formed under this nut-forming part of the wing. The nut-forming part and the intermediate portion of each wing are threaded in the novel manner shown at 14, in such a way as to engage the threads of screw 10 when the wings are not only in expanded position, as shown in Figs. 1–3, but when swung into their folded position, as shown in Figs. 4 and 5, and in intermediate position. In the drawing, the threaded portion of the wing is shown as a straight portion with a curved portion extending therefrom, but it is possible to obtain the desired function by other structures so long as they provide threaded portions which are angularly disposed relatively.

20 is a collar which embraces the two wings. It is constructed with bars 21, the inner surfaces of which form a pair of parallel shoulders 22 which engage the outer surface of the intermediate part of the wings and permit them to roll thereon as shown in Figs. 1 and 4, at the same time maintaining the threads 14 of the wings in mesh with the thread of the screw 10. The collar also has sides 23 between which the portions of the wings which extend from the nut-forming part fit.

When the wings are fully expanded, their shoulders 13 are seated on the upper surface of the collar 20 between the bars 21, their outer surfaces abut as at 15 (Fig. 1) on the under surfaces of these bars 21, and the inner ends of the respective nut-forming parts abut as at 16 (Fig. 3), so that a structure of strength and rigidity is provided.

17 is a spring which goes over a lug 24 on the collar 20, and under each of the wings with its ends projecting through holes 18 in the wings, so that it serves to hold the wings and collar together when the screw is removed and tends to swing the arms outwardly into their expanded position.

When desired to affix an article 30 to a wall 31, the rear surface of which is inaccessible, the screw 10 is put through the article and into the toggle head. A hole 32 is drilled in the wall and the toggle head thrust through it. The arms will fold, as they pass through the hole, into the positions shown in Fig. 4. After the ends of the wings have passed through the hole, they may be swung out into a position substantially at right angles to the screw. If the spring 17 is provided, they will swing out into this position automatically. But the spring is not essential, for the operator may cause the end of one of the wings to catch on the back of the wall and by pulling back on the screw the wings will be made to swing outwardly.

After the wings have been expanded, the screw may be tightened and the article 30 thereby firmly secured to the wall 31.

In Fig. 1 the adaptability of the device to uneven surfaces is illustrated. It is there shown that the end of one of the wings has come in contact with an obstruction 33 on the inner surface of the wall 31. In such a case, as the screw 10 is rotated, the inner threaded nut-forming parts of the wings will move relatively on the screw and permit the wings to assume the positions shown, as the screw is tightened.

If the orifice 32 happens to come adjacent to a corner so that there is a wall surface in the position indicated by the dotted line 34 in Fig. 4, an anchorage can be effected with one wing provided the thickness of wall 31 is as great or greater than the length of the wings. In such case, the unused wing will simply project idly into the orifice 32.

The structure shown in Figs. 10–13 will now be described. The wings, in these figures are designated by 41, the nut-forming part thereof by 42, and the screw engaging portion by 44. Also the points of engagement with the under side of the collar and the abutting portions of the nut-forming parts are designated respectively by 45 and 46. The foregoing parts correspond closely with similar parts of the previously described structure. The threads 44 are in this case interrupted as shown at 47.

The collar, designated in these Figs. 10–13 by 50, also corresponds with that shown in Figs. 1–7, in that it has parallel wing engaging bars 51, with shoulders 52, and side portions 53.

In this modified structure, however, lugs 43 extend laterally from the nut-forming part of the wings, and these engage the top of the sides of the collar when the wings are expanded, which sides are recessed as shown at 54 to receive these lugs.

The wings are in this case provided with side ribs or flanges 55 which stiffen the wings and are so shaped as to roll over each other as the wings swing. One rib of each wing is provided with a tooth 56 and the opposite rib of the other wing is provided with an indenture 57. These are positioned opposite the interrupted part 47 of the threads 44 so that when the wings are adjusted to the positions shown in Fig. 13 where there is no thread engagement between the wings and the screw, they will maintain the wings in proper relative position. When in this position the toggle head may be slipped on the screw freely but it will engage the screw thread when being pushed through the hole and also when fully expanded on the inside of the wall.

The spring 58 is constructed with open coils which are placed between one of the sides 53 of the collar and the adjacent edges of the wings and its ends press on the lugs 43 so that it has a tendency to spread to expand the wings and at the same time assists in keeping them in alinement by pressing them against the other side 53 of the collar.

The slip feature of this form of the toggle has been described; its operation and use is otherwise similar to that of the device shown in Figs. 1–9.

The slip feature may be attained without interrupting the teeth by making the teeth 56$^A$ as shown in Figs. 16 and 17, high enough to spread the wings apart. When this is done, it is desirable to enlarge or flare the upper ends of the nut-forming parts of the wings as shown at 42$^A$, so that when the device is tightened to clamping position the collar 50 will force the parts together. It is obvious that this form of toggle head will slip on the screw when the wings are swung to a proper degree of angularity in relation to the screw, as shown in Fig. 17, but will reengage the screw thread in other positions.

The wings may be made if desired with the ribs 55 but without the teeth and indentations, as shown for example in Fig. 18, in which case the curved surfaces of the ribs will roll over one another as the wings are swung.

Or, if desired, a plurality of intermeshing teeth may be formed on the ribs 55, as shown at 56$^B$ in Fig. 19.

In the device illustrated in Figs. 20 and 21, the wings 60 are constructed with side flanges 61 which overlap one another and are pivoted together as at 62. A spring 63 is provided to spread the wings apart. The wings are provided with two threaded portions 64, 65 above and below intermediate unthreaded portions 67 to provide the slip feature. The threads 64, 65 are not on curved surfaces, but are angularly disposed relatively, as are portions of the threads shown in the other figures, as it is within the scope of this invention to have angularly disposed threads either on straight or curved surfaces.

In Fig. 22 another structure is shown in which the wings 70 have side flanges 71, pivoted together at 72, but in this case the inner ends of the wings are arranged to abut, as at 76 when the wings are fully expanded. These wings 70 also have the angularly disposed threaded portions 74, 75, between which is an unthreaded part 77.

A modification is shown in Fig. 23 in which the wings 80 have their side flanges 81 pivoted on trunnions 82 projecting from opposite sides of a nut 83 which is in threaded engagement with the screw 10. In this case the inner ends only of the wings are threaded as shown at 84, to engage the thread of the screw when the wings are spread or expanded, to add strength to the structure when in use.

In Fig. 24, the wings 90 have side flanges 91 pivoted on trunnions 92 projecting from opposite sides of a collar 93 which has through it an unthreaded clearance hole for the screw 10. The wings are threaded as at 94 and 95 above and below the collar so that when folded or when expanded, they have threaded engagement with the screw, but in an intermediate position they are freed from the screw and the toggle head thus constructed may be slipped along the screw when desired.

In describing the inner semi-cylindrical part of wings of the structure of Fig. 1, for example, as a "nut-forming" part, no limitation is meant as it is obvious that the curved parts of the wings where threaded, also form a nut. A number of embodiments of this invention as applied to toggle-bolts, have been illustrated and described for the purpose of showing some of its uses. But it is obviously applicable to other structures and to other uses and I intend no limitations other than those imposed by the appended claims.

What I claim is:

1. A screw engaging member having a straight portion and a curved portion continuing therefrom, both of said portions being threaded and so arranged that in different angular positions of the member the threads on said portions may engage the threads of a screw.

2. A pair of cooperating screw engaging members, each having a straight portion and a curved portion continuing therefrom, both of said portions being threaded and so arranged that in different angular positions of the members the threads on said portions may engage the threads of a screw.

3. A pair of members having oppositely curved threaded portions so arranged that in different angular positions of the members the threaded portions thereof may engage the threads of a screw, said members together forming a nut.

4. A pair of members having oppositely curved threaded portions so arranged that in different angular positions of the members the threaded portions thereof may engage the threads of a screw, said members together forming a nut, said members being so constructed as to permit disengagement between the members and the screw when said members are in one angular position.

5. A pair of members having oppositely curved threaded portions so arranged that in different angular positions of the members the threaded portions thereof may engage the threads of a screw, said threaded portions being interrupted at an intermediate part of said threaded portions so as to release the threaded engagement between the member and the screw at one angular position of the members, said members together forming a nut.

6. A toggle bolt wing having a curved threaded portion near one of its ends to engage a screw in different angular positions of said wing relative to the axis of the screw.

7. A pair of cooperating toggle bolt wings, each having a curved threaded portion near one of its ends to engage a screw in different angular positions of said wings relative to the axis of the screw.

8. A toggle bolt head comprising a pair of wings and an intermediate member arranged to position the wings relative to each other, said wings having their inner ends threaded to engage a screw and resilient means for interconnecting the wings and said member.

9. A toggle bolt head comprising a pair of wings and an intermediate member arranged to position the wings relative to each other, said wings having their inner ends threaded to engage a screw and a spring coacting with said wings and arranged to spread the wings apart.

10. A toggle bolt head comprising a pair of wings and an intermediate member arranged to position the wings relative to each other, each of said wings having a curved threaded portion near one of its ends and resilient means for spreading the wings.

11. A toggle bolt head comprising a pair of wings and an intermediate member arranged to position the wings relative to each other, each of said wings having a curved threaded portion near one of its ends and a spring coacting with and arranged to spread the wings apart.

12. A toggle bolt head comprising a pair of wings and an intermediate member arranged to position the wings relative to each other, each of said wings having a curved threaded portion near one of its ends, said threads being interrupted at an intermediate part of said portion.

13. A toggle bolt head comprising a pair of wings and an intermediate member arranged to position the wings relative to each other, each of said wings having a curved threaded portion near one of its ends, said threads being interrupted at an intermediate part of said portion, and a spring engaging the wings and arranged to spread the wings apart.

14. A toggle bolt head comprising a pair of wings and a collar, said collar having a pair of bars engaging the outer surfaces of said wings and around which the wings are arranged to swing, the ends of the wings being arranged to abut each other when the wings have reached the limit of said swinging movement, and having internal threads adapted to engage a bolt.

15. A toggle bolt head comprising a pair of wings and a collar, said collar having a pair of bars engaging the outer surfaces of said wings and around which the wings are arranged to swing, the ends of the wings being arranged to abut each other when the wings have reached the limit of said swinging movement, each of said wings having a portion arranged to engage the under side of said collar to limit the swinging movement of the wings.

16. A toggle bolt head comprising a pair of wings and a collar, said collar having a pair of bars engaging the outer surfaces of said wings and around which the wings are arranged to swing, the ends of the wings being arranged to abut each other when the wings have reached the limit of said swinging movement and having internal threads adapted to engage a bolt, each of said wings having a portion arranged to engage the upper side of said collar to limit the swinging movement of the arms.

17. A toggle bolt head comprising a pair of wings and a collar, said collar having a pair of bars engaging the outer surfaces of said wings and around which the wings are arranged to swing, the ends of the wings being arranged to abut each other when the wings have reached the limit of said swinging movement, each of said wings having a portion arranged to engage the under side of said collar and another portion arranged to engage the upper side of said collar to limit the swinging movement of the wings.

18. A toggle bolt head comprising a pair of wings and a collar, said collar having a pair of bars engaging the outer surfaces of said wings and around which the wings are arranged to swing, each of said wings having a laterally extending portion arranged to engage the upper side of said collar to limit the swinging movement of the wings, said collar being recessed to receive said laterally extending portions.

19. A toggle bolt head comprising a pair of wings and a collar, said collar having a pair of bars engaging the outer surfaces of said wings and around which the wings are arranged to swing, each of said wings having lugs extending laterally from opposite sides of each wing arranged to engage the upper side of said collar to limit the swinging movement of the wings, said collar being recessed to receive said laterally extending lugs.

20. A toggle bolt head comprising a pair of wings and a collar, said collar having a pair of bars engaging the outer surfaces of said wings and around which the wings are arranged to swing, each of said wings having a threaded portion arranged to engage a screw in different angular positions of the wings and having a portion arranged to engage the under side of said collar to limit said swinging movement.

21. A toggle bolt head comprising a pair of wings and a collar, said collar having a pair of bars engaging the outer surfaces of said wings and around which the wings are arranged to swing, each of said wings having a threaded portion arranged to engage a screw in different angular positions of the wings and having a portion arranged to engage the upper side of said collar to limit said swinging movement.

22. A toggle bolt head comprising a pair of wings and a collar, said collar having a pair of bars engaging the outer surfaces of said wings and around which the wings are arranged to swing, each of said wings having a threaded portion arranged to engage a screw in different angular positions of the wings and having a portion arranged to engage the under side of said collar and another portion arranged to engage the upper side of said collar to limit the swinging movement of the wings.

23. A toggle bolt head comprising a pair of wings and a collar, said collar having a pair of bars engaging the outer surfaces of said wings and around which the wings are arranged to swing, each of said wings having a threaded portion arranged to engage a screw in different angular positions of the wings and the ends of the wings being arranged to abut each other when the wings have reached the limit of said swinging movement.

24. A toggle bolt head comprising a pair of wings and a collar, said collar having a pair of bars engaging the outer surfaces of said wings and around which the wings are arranged to swing, the ends of the wings being arranged to abut each other when the wings have reached the limit of said swinging movement, each of said wings having a threaded portion arranged to engage a screw in different angular positions of the wings and having a portion arranged to engage the under side of said collar to limit the swinging movement of the wings.

25. A toggle bolt head comprising a pair of wings and a collar, said collar having a pair of bars engaging the outer surfaces of said wings and around which the wings are arranged to swing, the ends of the wings being arranged to abut each other when the wings have reached the limit of said swinging movement, each of said wings having a threaded portion arranged to engage a screw in different angular positions of the wings and having a portion arranged to engage the upper side of said collar to limit the swinging movement of the wings.

26. A toggle bolt head comprising a pair of wings and a collar, said collar having a pair of bars engaging the outer surfaces of said wings and around which the wings are arranged to swing, the ends of the wings being arranged to abut each other when the wings have reached the limit of said swinging movement, each of said wings having a threaded portion arranged to engage a screw in different angular positions of the wings and having a portion arranged to engage the under side of said collar and another portion arranged to engage the upper side of said collar to limit the swinging movement of the wings.

27. A toggle bolt head comprising a pair of wings and a collar, said collar having a pair of bars engaging the outer surfaces of said wings and around which the wings are arranged to swing, each of said wings having a threaded portion arranged to engage a screw in different angular positions of the wings and having a laterally extending portion arranged to engage the upper side of said collar to limit the swinging movement of the wings, said collar being recessed to receive said laterally extending portions.

28. A toggle bolt head comprising a pair of wings and a collar, said collar having a pair of bars engaging the outer surfaces of said wings and around which the wings are arranged to swing, each of said wings having a threaded portion arranged to engage a screw in different angular positions of the wings and having lugs extending laterally from opposite sides of each wing arranged to engage the upper side of said collar to limit the swinging movement of the wings, said collar being recessed to receive said laterally extending lugs.

29. A toggle bolt head comprising a pair of wings and a collar, said collar having a pair of bars engaging the outer surfaces of said wings and around which the wings are arranged to swing, the ends of the wings being arranged to abut each other when the wings have reached the limit of said swinging movement, and a spring engaging the wings and arranged to spread the wings apart.

30. A toggle bolt head comprising a pair of wings and a collar, said collar having a pair of bars engaging the outer surfaces of said wings and around which the wings are arranged to swing, the ends of the wings being arranged to abut each other when the wings have reached the limit of said swinging movement, each of said wings having a portion arranged to engage the under side of said collar to limit the swinging movement of the wings, and a spring coacting with the wings and arranged to spread the wings apart.

31. A toggle bolt head comprising a pair of wings and a collar, said collar having a pair of bars engaging the outer surfaces of said wings and around which the wings are arranged to swing, the ends of the wings being arranged to abut each other when the wings have reached the limit of said swinging movement, each of said wings having a portion arranged to engage the under side of said collar and another portion arranged to engage the upper side of said collar to limit the swinging movement of the wings, and a spring engaging the wings and arranged to spread the wings apart.

32. A toggle bolt head comprising a pair of wings and a collar, said collar having a pair of bars engaging the outer surfaces of said wings and around which the wings are arranged to swing, each of said wings having lugs extending laterally from opposite sides of each wing arranged to engage the upper side of said collar to limit the swinging movement of the wings, said collar being recessed to receive said laterally extending lugs, and a spring coacting with the wings and arranged to spread the wings apart.

33. A toggle bolt head comprising a pair of wings and a collar, said collar having a pair of bars engaging the outer surfaces of said wings and around which the wings are arranged to swing, each of said wings having a threaded portion arranged to engage a screw in different angular positions of the wings and having a portion arranged to engage the under side of said collar to limit said swinging movement, and a spring coacting with the wings and arranged to spread the wings apart.

34. A toggle bolt head comprising a pair of wings and a collar, said collar having a pair of bars engaging the outer surfaces of said wings and around which the wings are arranged to swing, each of said wings having a threaded portion arranged to engage a screw in different angular positions of the wings, and the ends of the wings being arranged to abut each other when the wings have reached the limit of said swinging movement, and a spring coacting with the wings and arranged to spread the wings apart.

35. A toggle bolt head comprising a pair of wings and a collar, said collar having a pair of bars engaging the outer surfaces of said wings and around which the wings are arranged to swing, the ends of the wings being arranged to abut each other when the wings have reached the limit of said swinging movement, each of said wings having a threaded portion arranged to engage a screw in different angular positions of the wings and having a portion arranged to engage the under side of said collar to limit the swinging movement of the wing, and a spring engaging the wings and arranged to spread the wings apart.

36. A toggle bolt head comprising a pair of wings and a collar, said collar having a pair of bars engaging the outer surfaces of said wings and around which the wings are arranged to swing, each of said wings having a threaded portion arranged to engage a screw in different angular positions of the wings and having lugs extending laterally from opposite sides of each wing arranged to engage the upper side of said collar to limit the swinging movement of the wings, said collar being recessed to receive said laterally extending lugs, and a spring coacting with the wings and collar and arranged to spread the wings apart.

37. A pair of cooperating toggle bolt wings, each having a threaded portion near one of its ends to engage a screw in different angular positions of said wings relative to the axis of the screw, and flanges extending from the sides of the wings and having abutting surfaces.

38. A pair of cooperating toggle bolt wings, each having a threaded portion near one of its ends to engage a screw in different angular positions of said wings relative to the axis of the screw, and flanges extending from the sides of the wings having interengaging portions.

39. A toggle bolt head comprising a pair of wings and an intermediate member arranged to position the wings relatively, each of said wings having a threaded portion near one of its ends and flanges extending from its sides, said flanges having abutting surfaces.

40. A toggle bolt head comprising a pair of wings and an intermediate member arranged to position the wings relatively, each of said wings having a threaded portion near one of its ends and flanges extending from its sides, said flanges having abutting surfaces, and resilient means for spreading the wings.

41. A toggle bolt head comprising a pair of wings and an intermediate member arranged to position the wings relatively, each of said wings having a threaded portion near one of its ends and flanges extending from its sides, said flanges having abutting surfaces, said threads being interrupted at an intermediate part of said portion, and the flanges having interengaging elements opposite the interrupted thread portions.

42. A pair of cooperating toggle bolt wings, each having a threaded portion near one of its ends to engage a screw in different angular positions of said wings relative to the axis of the screw and flanges extending from the sides of the wings and having abutting surfaces, and resilient means engaging said wings to spread the wings.

43. A pair of cooperating toggle bolt wings, each having a threaded portion near one of its ends to engage a screw in different angular positions of said wings relative to the axis of the screw and flanges extending from the sides of the wings and having interengaging portions, and resilient means coacting with said wings to spread the wings.

44. A toggle bolt head comprising a pair of wings and an intermediate member arranged to position the wings relatively to each other, each of said wings having a threaded portion near one of its ends, and flanges extending from its sides, said flanges having abutting surfaces, and resilient means coacting with the wings and said member.

45. A toggle bolt head comprising a pair of wings and an intermediate member arranged to position the wings relatively to each other, each of said wings having a threaded portion near one of its ends, and flanges extending from its sides, said flanges having abutting surfaces, said threads being interrupted at an intermediate part of said portions, the flanges having interengaging elements opposite the interrupted thread portions, and resilient means coacting with the wings and said member.

46. A toggle bolt head comprising a pair of wings and a collar, said collar having sides and a pair of bars engaging the outer surfaces of said wings and around which the wings are arranged to swing and a spring interposed between the wings and one of the sides of the collar, arranged to press the wings against the other side of the collar.

47. A toggle bolt head comprising a pair of wings and a collar, said collar having sides and a pair of bars engaging the outer surfaces of said wings and around which the wings are arranged to swing and a spring having a part interposed between the wings and one of the sides of the collar, arranged to press the wings against the other side of the collar and having parts engaging the wings to spread the wings apart.

48. A toggle bolt head comprising a pair of wings and a collar, said collar having sides and a pair of bars engaging the outer surfaces of said wings and around which the wings are arranged to swing, each of said wings having lugs extending laterally from opposite sides of each wing arranged to engage the upper part of the sides of said collar and a spring having a part interposed between the wings and one of the sides of the collar and other parts engaging said lugs.

49. A toggle bolt head comprising a pair of wings and a collar, said collar having sides and a pair of bars engaging the outer surfaces of said wings and around which the wings are arranged to swing and a spring having a coil interposed between the wings and one of the sides of the collar and portions extending from said coil engaging the wings.

50. A toggle bolt head comprising a pair of wings and a collar, said collar having sides and a pair of bars engaging the outer surfaces of said wings and around which the wings are arranged to swing, each of said wings having lugs extending laterally from opposite sides of each wing and a spring having a coil interposed between the wings and one of the sides of the collar and parts extending therefrom engaging said lugs.

51. A toggle bolt head comprising a pair of wings having flat flanges extending from the sides of the wings, a collar having a pair of bars engaging the outer surfaces of said wings and around which the wings are arranged to swing and flat sides connecting the bars, each of said wings having lugs extending laterally from opposite sides of each wing arranged to engage the upper part of the sides of said collar and a spring having a coil interposed between the flanges of the wings and one of the sides of the collar, arranged to press the other flanges of the wings against the other side of the collar and having parts engaging the lugs and arranged to spread the wings apart.

52. A screw engaging member having threaded portions angularly disposed and so arranged that said threaded portions may engage the threads of a screw in different angular positions of the member relative to the axis of the screw.

53. A screw engaging member having a straight portion and a portion continuing therefrom at an angle, both of said portions being threaded and so arranged that the threaded portions may engage the threads of the screw in different angular positions of the member relative to the axis of the screw.

54. A pair of cooperating screw engaging members, each having a straight portion and a portion continuing therefrom at an angle, both of said portions being threaded and so arranged that said threaded portions may engage the threads of the screw in different angular positions of the members relative to the axis of the screw.

55. A pair of cooperating screw engaging members, each having two threaded portions angularly disposed and an intermediate unthreaded part, so arranged that the threaded portions may engage the threads of a screw in different angular positions of the members relative to the axis of the screw.

56. A pair of members, each having threaded portions angularly disposed to each other, so arranged that in different angular positions of the members relative to the axis of a screw, the threaded portions thereof may engage the threads of the screw, said members together forming a nut.

57. A toggle bolt head comprising a pair of wings and a collar arranged to position the wings relatively to each other, each of said wings having near its inner end threaded portions angularly disposed to each other, so arranged that in different angular positions of the wings relative to the axis of a screw, the threaded portions thereof may engage the threads of the screw.

58. A toggle bolt head comprising a pair of wings and a collar arranged to position the wings relatively to each other, each of said wings having near its inner end threaded portions angularly disposed to each other and an intermediate unthreaded portion, so arranged that in different angular positions of the wings relative to the axis of a screw, the threaded portions thereof may engage the threads of the screw and a spring interconnecting the wings and the collar and arranged to spread the wings apart.

In witness whereof, I have hereunto set my hand this 30th day of January, 1925.

CHARLES C. TOMKINSON.